April 16, 1968   R. M. VAUGHN   3,378,054

RAPID THREADING FASTENER ASSEMBLY

Original Filed Feb. 19, 1965

INVENTOR.
RUDOLPH M. VAUGHN
BY Elliott & Pastoriza
ATTORNEYS

# United States Patent Office 3,378,054
Patented Apr. 16, 1968

3,378,054
RAPID THREADING FASTENER ASSEMBLY
Rudolph M. Vaughn, 2127 Salt Air Drive,
Santa Ana, Calif. 92705
Continuation of application Ser. No. 433,865, Feb. 19,
1965. This application Feb. 27, 1967, Ser. No. 619,070
2 Claims. (Cl. 151—19)

ABSTRACT OF THE DISCLOSURE

This disclosure relates to a bolt and nut wherein the end of the bolt is countersunk to define a tubular structure. The walls of the tube are slotted to permit radial expansion and contraction of the shank end portion of the bolt. The end portion of the bolt is threaded exteriorly in one embodiment and interiorly in another embodiment. The cooperating nut includes a chamber having a central projection defining an annular recess. In one embodiment, the inner annular wall of the recess is threaded for cooperation with the external threads on the tubular structure of the bolt and the central projection is tapered such that it will expand the walls of the tubular structure to cause mating engagement of the bolt threads with the nut threads after a major portion of the bolt threads have been inserted past the nut threads thereby enabling a rapid fastening to be effected. In a second embodiment, the central projection of the nut is exteriorly threaded for mating engagement with the interior threads in the end tubular structure of the bolt and the inner annular wall of the nut recess is tapered to effect such mating engagement by moving the tubular wall structure of the bolt radially inwardly after a major portion of the bolt threads have passed the nut threads thus again effecting a very rapid fastening device.

---

This application is a continuation of application Ser. No. 433,865, filed Feb. 19, 1965, now abandoned.

This invention relates generally to fastening devices and more particularly to a novel rapid threading fastener assembly for securing structural members such as panels and the like together.

In securing members of the type under consideration together, the members themselves are usually of metal and provided with aligned bores for receiving a bolt and nut assembly. The nut may, if desired, be permanently secured over one of the openings in one member so that it is only necessary to insert the bolt through the opposite opening in the other member and thread it into the nut. By this arrangement, the members may be fastened or unfastened from one side only.

While the provision of a fastener in which the nut is held in place greatly facilitates the securing and releasing of members such as panels and the like, there is still involved the time consuming operation of threading and unthreading the individual bolts into and out of the nut threads. It would be desirable to provide a fastener in which the threading time could be reduced and yet insure the complete inter-engagement of several threads to retain the strength and integrity of the fastening.

In fasteners provided heretofore, the bolt threads are on the exterior of the bolt and are arranged to be received within interior threads in the nut. As a consequence of this design, when the bolt is passed through aligned openings in members to be fastened together, the threads of the bolt often become damaged as a consequence of contact with the inside walls of the openings in urging the bolt through the openings. The same situation obtains in removing the bolt so that eventually the exterior threads on the bolt may become damaged or worn and the life of the fastener materially reduced.

With all of the above in mind, it is accordingly a primary object of this invention to provide a rapid threading fastener assembly wherein the foregoing desirable end of reducing the time of threading is realized.

More particularly, it is an object to provide an improved rapid threading fastener assembly in which a bolt member may simply be inserted through aligned openings and then only require a few turns to effect tightening of the bolt in a permanently secured nut on the opposite side of the opening, and yet in which several of the mating threads are engaged so that the advantage of conventional type bolt and nut fasteners wherein several turns are required of the bolt to effect a fastening is realized.

Another object of this invention is to provide an improved rapid threading fastener assembly of unique design such that the bolt threads are not exposed so that they will not be damaged when a bolt is passed through the aligned openings in members to be secured together.

Briefly, these and many other objects and advantages of this invention are attained by providing a bolt having a threaded end structure for cooperation with a nut provided with an interior portion including threads for mating engagement with the bolt threads. The threaded end structure of the bolt and the interior threaded structure of the nut include cooperating means for effectively radially expanding or contracting the bolt threads upon urging of the threaded end of the bolt into the interior of the nut in such a manner as to effect mating engagement of the bolt threads with the nut threads. This cooperating means preferably takes the form of tapered camming surfaces which effect the desired radial movement.

As a consequence of the foregoing design, it is possible to insert the bolt into the nut with initial threads of the bolt extending past the initial threads of the nut prior to the effective mating engagement of the bolt threads with the nut threads. Thereafter, only a few turns are required to place all of the threads into mating engagement with each other and provide a secure fastening.

In unthreading of the bolt from the nut, a radial movement of the bolt threads takes place in an opposite direction to release the threads after only a few turns so that the bolt may very quickly be removed.

In accordance with a particular embodiment of the invention, the threaded end of the bolt is designed in the form of a tubular structure so as to provide internal threads within a counter sunk end opening in the bolt. The wall of the tubular structure is slotted to permit radial contraction and expansion of the tubular structure. The cooperating nut includes a central projection in its inner chamber which is externally threaded and arranged to be received within the countersunk opening in the end of the bolt. The annular wall of the nut, on the other hand, functions to effect a radial inward movement of the tubular structure of the bolt to effect complete mating engagement of the threads after the bolt has been inserted into the nut.

With the above design, the bolt threads are not exposed so that they are not subject to possible damage when inserting the bolt through aligned openings in members to be fastened together.

A better understanding of the invention will be had by now referring to the preferred embodiments thereof as illustrated in the accompanying drawings, in which.

Figure 1:
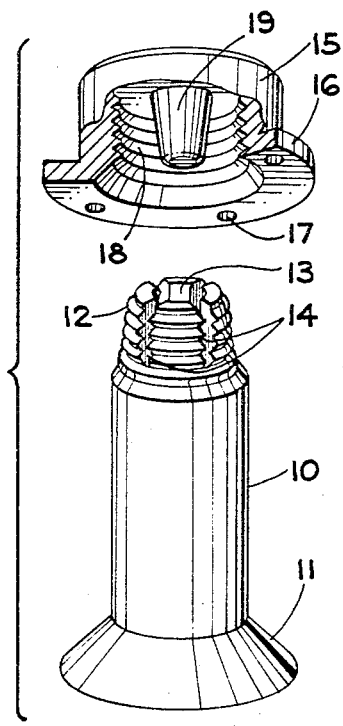
FIGURE 1 is an exploded fragmentary perspective view of a first embodiment of the bolt and nut assembly of this invention.

Referring first to FIGURE 1, there is illustrated a bolt 10 terminating at one end in an enlarged head 11 and at its other end in a threaded end structure. As shown, the threaded end structure includes external bolt threads 12 and is countersunk as at 13 to define a tubular structure. The wall of this tubular structure is slotted, as at 14, to permit radial contraction or expansion of the wall. In the embodiment of FIGURE 1, the countersunk portion 13 of the tubular structure is cylindrical or straight while the outside exterior threads 12 taper towards a smaller diameter at their extreme end.

Cooperating with the bolt 10 is a nut 15 provided with an annular end flange 16 having openings 17 to enable the nut to be permanently secured over an end opening in a member to be fastened. As shown, the nut includes an interior chamber which, in the embodiment of FIGURE 1, includes an annular wall having internal nut threads 18. The nut threads 18 are straight as shown. Within the chamber there is also provided a tapered central projection 19, adapted to be received within the countersunk portion 13 of the tubular structure at the end of the bolt 10. The annular wall of the chamber and the projection thus define an annular receiving recess for the tubular structure of the bolt.

Figure 2:
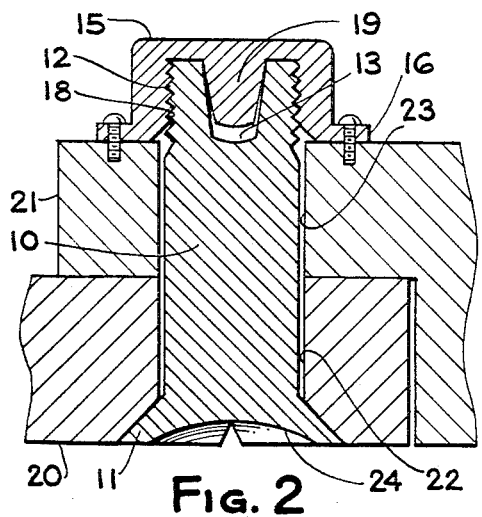
FIGURE 2 is a cross-section of the structure illustrated in FIGURE 1 in assembled position for securing first and second members together.

Referring now to FIGURE 2, the manner in which the bolt and nut structure of FIGURE 1 operates will become clear. In FIGURE 2 there are shown first and second members 20 and 21 having aligned openings 22 and 23 for receiving the bolt 10. The nut 15 is secured over the end of the opening 23 by suitable screws or rivets passed through the flange 16 as shown.

With the nut 15 permanently assembled over one end of the aligned openings 22 and 23, the bolt 10 may be inserted through the openings and received within the annular receiving recess defined by the interior chamber and central projection 19. However, because of the tapered configuration of the threads 12 as illustrated in FIGURE 1, the threads will not immediately mate with the threads 18 but will simply move past these threads as the bolt 10 is urged into the nut 15. The projection 19, on the other hand, will be received within the counter sunk opening 13 and effect a radial expansion of the tubular wall of the bolt 10 and thereby effect mating engagement of the bolt threads 12 with the nut threads 18.

FIGURE 2 illustrates the bolt fully inserted within the nut 15 but it will be realized that this securment may be effected with only a few turns since the initial movement of the bolt 10 will not cause sufficient radial expansion of the walls to effect mating engagement of the threads. It will only be after the bolt has been inserted a considerable distance that the projection 19 will then function to effect a mating engagement of all the threads. Thereafter, only a relatively few turns of the bolt are necessary to secure the fastening.

In the secured position illustrated in FIGURE 2, it will be noted that all of the threads 12 and 18 are in mating engagement so that even though only a few turns were required of the bolt, a complete thread engagement results. The integrity of the fastening is thus not materially reduced as a consequence of the present construction. The bolt head 11 preferably is provided with a high torque slot 24 to enable a very tight fastening to be made.

Figure 3:
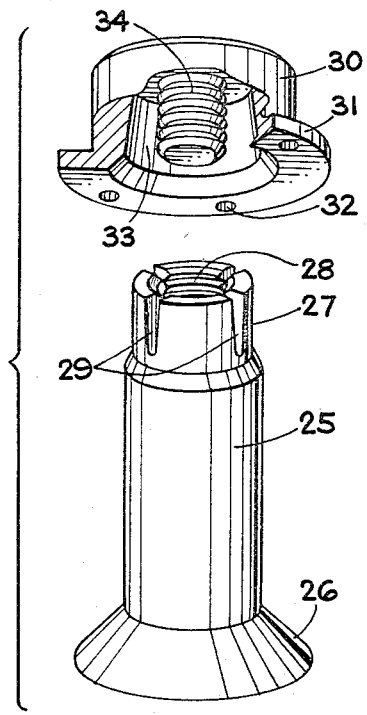
FIGURE 3 is an exploded fragmentary perspective view of a second embodiment of the bolt and nut assembly of this invention.
Figure 4:
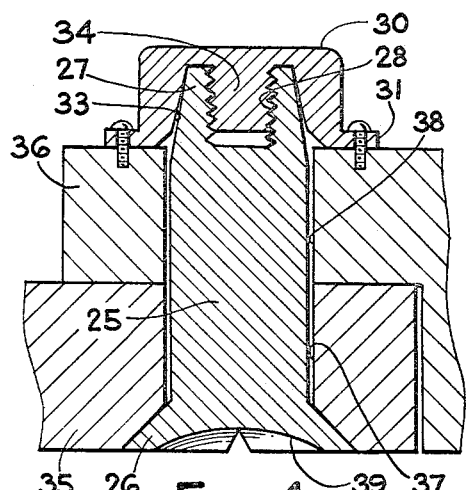
FIGURE 4 is a cross-section of the structure of FIGURE 2 in assembled relationship for securing first and second members together.

Referring now to FIGURES 3 and 4, there is shown a second embodiment of the invention which operates similarly to the first embodiment insofar as the rapid threading feature is concerned. However, in the embodiment of FIGURES 3 and 4 the bolt threads are not exposed. Thus, with particular reference to FIGURE 3, there is illustrated a bolt 25 having an enlarged head 26 at one end and terminating at its other end in a tubular structure 27 defined by a counter sunk bore having internal bolt threads 28. Suitable slots 29 are provided in the wall of the tubular structure to permit radial expansion and contraction of these walls.

The nut 30, in turn, includes an annular flange 31 with openings 32 to effect permanent fastening of the nut to one of the end openings in members to be fastened together. The nut 30 also includes an interior chamber having a tapered interior annular wall 33 and a central projection to define an annular receiving recess. The projection includes external nut threads 34 for mating engagement with the bolt threads 28 upon insertion of the tubular end structure of the bolt 25 into the annular receiving recess.

In the normal position of the tubular end structure of the bolt 25, the exterior wall of the tubular structure 27 is normally straight with the interior threads 28 tapering, as shown. The external nut threads 34 on the projection of the nut 30, on the other hand, are straight, as was the case with the internal threads 18 in the embodiment of the nut structure in FIGURE 1.

Referring now to FIGURE 4, there are shown first and second members 35 and 36 having aligned openings 37 and 38 for receiving the bolt 25. The nut 30, as shown, is secured over one end of the opening 38 in a position to receive the tubular end structure of the bolt 25. When this tubular end structure is inserted into the nut 30, the tapered annular wall 33 cooperates with the normally straight exterior wall 27 of the tubular structure to cam or otherwise cause radial contraction of the tubular wall of the bolt and thereby effect mating engagement of the bolt threads 28 with the nut threads 34. Again complete engagement of these threads will not be effected until the bolt has been inserted for a certain distance into the nut 30 so that only a relatively few turns are required to secure the bolt 25 in the nut 30. As in the case of the bolt 10, the head 26 of the bolt 25 is provided with a high torque slot 39.

The embodiment of FIGURES 3 and 4 essentially represents a reversal of parts as compared to the embodiment of FIGURES 1 and 2. However, there is a surprising and unexpected result as a consequence of this construction. More specifically, the reversal of parts enables the provision of the bolt threads 28 to be completely protected so that the exterior of the bolt contains no threads with the advantage that when the bolt 25 is passed through the aligned openings, the bolt thread will not be damaged.

From the foregoing description, it will be evident that the present invention has provided a greatly improved rapid threading fastener assembly meeting the various objects set forth heretofore.

While only two particular embodiments of the invention have been shown and described, various modifications that fall clearly within the scope and spirit of the invention will occur to those skilled in the art. The rapid threading fastener assembly is therefore not to be thought of as limited to the particular examples set forth merely for illustrative purposes.

What is claimed is:

1. A rapid threading fastener for securing together first and second members having aligned bores, comprising, in combination: a bolt having an enlarged head for engaging said first member and a countersunk end defining a tubular structure, the wall of said tubular structure being slotted to permit radial contraction and expansion of said wall, the exterior portion of said wall being tapered and including exterior bold threads the major portion of which have diameters less than a first given diameter; and a nut having an enlarged flange portion for engaging said second member and an internal chamber including a central tapered projection to define an annular receiving recess, the inner annular wall of said annular receiving recess including nut threads of a second given diameter greater than said first given diameter by a distance such that the major portion of the threads of said bolt can pass the major portion of the threads of said nut without relative rotation being necessary when said bolt is inserted in said nut, said tubular structure being received over said tapered central projection to effect camming engagement to move the wall of said tubular structure radially outwardly and effect mating engagement of said bolt threads with said nut threads after a major portion of the threads on said bolt have passed the threads on said nut whereby only a few turns of said bolt are necessary to tighten said bolt to said nut.

2. A rapid threading fastener assembly for securing together first and second members having aligned bores, comprising, in combination: a bolt having an enlarged head for engaging said first member and a countersunk end defining a tubular structure, the wall of said tubular structure being slotted to permit radial contraction and expansion of said wall, the interior portion of said wall being tapered and including interior bolt threads the major portion of which have diameters less than a first given diameter; and a nut having an enlarged flange portion for engaging said second member and an internal chamber including a central projection to define an annular receiving recess, the inner annular wall of said annular receiving recess being tapered, the exterior of said central projection including nut threads of a second given diameter less than said first given diameter by a distance such that the major portion of the threads of said bolt can pass the major portion of the threads of said nut without relative rotation being necessary when said bolt is inserted in said nut, said tubular structure being received within said annular recess such that the inner annular wall of said recess effects a camming engagement to move the wall of said tubular structure radially inwardly and effect mating engagement of said bolt threads with said nut threads after a major portion of the threads on said bolt have passed the threads on said nut whereby only a few turns of said bolt are necessary to tighten said bolt to said nut.

References Cited

UNITED STATES PATENTS

| | | | |
|---|---|---|---|
| 327,793 | 10/1885 | Hall | 151—19 |
| 1,539,513 | 5/1925 | Ross | 151—19 |
| 1,768,426 | 6/1930 | Stelzer | 85—4 |
| 2,508,409 | 5/1950 | Lord | 151—19 |
| 2,591,631 | 4/1952 | Stanitski | 151—54 |

FOREIGN PATENTS

| | | |
|---|---|---|
| 83,119 | 3/1921 | Austria. |
| 444,037 | 5/1927 | Germany. |
| 21,847 | 9/1912 | Great Britain. |
| 114,391 | 4/1918 | Great Britain. |
| 380,967 | 9/1932 | Great Britain. |

MARION PARSONS, JR., *Primary Examiner.*